United States Patent [19]
Rewitzer et al.

[11] Patent Number: 5,618,432
[45] Date of Patent: Apr. 8, 1997

[54] PROCESS FOR SOLVENT RECOVERY

[75] Inventors: Siegfried Rewitzer, Ihrlerstein; Peter M. Roth, Eppstein/Ts., both of Germany

[73] Assignee: Hoechst Agteingesellschaft, Germany

[21] Appl. No.: 183,155

[22] Filed: Jan. 18, 1994

[30] Foreign Application Priority Data

Jan. 15, 1993 [DE] Germany .......................... 43 00 921.2

[51] Int. Cl.⁶ .................................................... B01D 11/00
[52] U.S. Cl. ........................... 210/634; 210/805; 134/10; 134/13; 264/179; 203/14; 55/DIG. 30
[58] Field of Search ..................................... 210/634, 180, 210/774, 767, 805; 134/10, 13; 528/501; 203/75, 77, 81, 49, 14; 264/179; 55/DIG. 30

[56] References Cited

U.S. PATENT DOCUMENTS

| | | | |
|---|---|---|---|
| 3,608,043 | 9/1971 | Reni | 264/179 |
| 3,928,517 | 12/1975 | Knight et al. | 264/179 |
| 4,040,913 | 8/1977 | Clovis et al. | 203/77 |
| 4,043,873 | 8/1977 | Ackermann et al. | 203/77 |
| 4,057,491 | 11/1977 | Bushnell et al. | 203/49 |
| 4,070,253 | 1/1978 | Hofen et al. | 203/49 |
| 4,303,478 | 12/1981 | Field | 203/19 |
| 4,436,902 | 3/1984 | Wood et al. | 203/75 |
| 4,484,984 | 11/1984 | Bannon | 203/42 |
| 4,589,957 | 5/1986 | Sherk | 203/75 |
| 4,793,938 | 12/1988 | Dayton | 210/774 |
| 4,847,057 | 7/1989 | Brugerolle et al. | 95/169 |
| 4,976,825 | 12/1990 | Iwasaki et al. | 203/71 |

FOREIGN PATENT DOCUMENTS

| | | |
|---|---|---|
| 1543411 | 8/1969 | Germany . |
| 2506193 | 8/1976 | Germany . |

OTHER PUBLICATIONS

European Search Report No. 94100195.0, May 30, 1994.

Primary Examiner—Ana Fortuna
Attorney, Agent, or Firm—Connolly & Hutz

[57] ABSTRACT

A process for recovery and reuse of liquids used as solvents and diluents in a chemical reaction and/or the processing of substances, the process include the introduction of a solvent, a diluent, and a substance to be reacted and/or processed into a processing plant, feeding a used mixture of solvent, diluent and residues into a recovery plant, separating the solvent, diluent and residue resulting from the chemical reaction and/or processing of substances, recycling the solvent and diluent back to the processing plant, ejecting residues, and ejecting the treated substances. The apparatus for carrying out the process is also described.

20 Claims, 8 Drawing Sheets

PROCESS FOR SOLVENT RECOVERY

FIELD OF THE INVENTION

The present invention relates to a process for solvent recovery and an apparatus adapted for carrying out this process.

DESCRIPTION OF THE PRIOR ART

In many production and processing processes, solvents are brought into contact with the actual raw material and/or the product. Conventionally, the solvent is contaminated in the course of this and, subsequently to the actual process, is subjected to a purification. Frequently the individual processes require that the solvents used be diluted by specific addition of another liquid, whether it be to regulate a required solution viscosity or, for cost reasons or to be able to carry out certain process steps, for example precipitation of a dissolved substance in a precipitation bath. Both the contaminants (waste materials) and the diluent are conventionally ejected from a solvent recovery plant, while the purified solvent is returned to the production process. Such previously known processes are common practice. An example thereof is given in Kirk-Othmer: "Encyclopedia of chemical Technology", Vol. 21, 3rd Edition, John Wiley & Sons (1983), head word "Solvent Recovery", p. 357.

In recent years, requirements of the operation of plants in which chemical substances are reacted or processed have become increasingly stricter. This relates both to the emission of chemical substances which originate from the operation of such plants and the consumption of energy in the operation of such plants.

There is thus a requirement for processes and apparatuses with which chemical substances can be reacted or processed with a minimum of energy consumption and/or in the operation of which a minimum of waste substances results.

SUMMARY OF THE INVENTION

A process is provided by the present invention in which at least a part of the solvent and diluent used is recirculated, so that by this simple measure a reduced consumption of solvent and diluent for this solvent is achieved. In a preferred embodiment of the process according to the invention, a reduction of the energy consumption in the solvent recovery is achieved.

The present invention relates to a process for recovery and reuse of liquids which are used as solvents and for the specific dilution of the solvent in the chemical reaction and/or the processing of substances including the measures:

a1) introducing fresh solvent into a processing plant, b1) introducing fresh diluent into the processing plant, c1) introducing substances to be reacted and/or to be processed into a treatment apparatus of the processing plant, d1) ejecting products from the processing plant, e1) feeding the used mixture of solvent, diluent and residues from the reaction and/or processing of the substances to a solvent recovery plant, f1) separating the mixture from step e1) in the solvent recovery plant into a solvent fraction, which is primarily composed of solvent and possibly contains a small proportion of diluent, into a diluent fraction, which is primarily composed of diluent and possibly contains a small proportion of solvent, and into residues from the reaction and/or processing of the substances, g1) returning the solvent fraction to the processing plant, so that this fraction is again available for the reaction and/or processing of the substances, h1) returning the diluent fraction to the processing plant so that this fraction is again available for the reaction and/or processing of the substances, and i1) ejecting residues from the reaction and/or processing of the substances from the processing plant.

The term "chemical reaction of substances" is taken to have its broadest meaning. In this case, therefore, these are processes in which any substances are converted into other chemical substances with a change in their chemical composition. These can be reactions in which a starting material is converted to a product of a new chemical constitution or in which two or more starting materials are reacted together to give one or more products of new chemical constitution. Preferred examples of such chemical reactions are polymerization reactions, such as polymerizations, polycondensations or polyadditions.

The term "processing of substances" is likewise taken to have its broadest meaning. In this case, therefore, these are processes in which any substances are processed, retaining their chemical composition. These can be purification processes which are carried out with the aid of mixtures containing solvent and diluent, for example for degreasing objects or for recrystallizing chemical substances, or these are shaping processes in which a dissolved chemical substance or a mixture of such substances is processed to give a predetermined shape. Examples thereof are the production of films, fibers or coatings from solutions of dissolved compounds, in particular from polymer solutions.

The term "solvent" is taken to mean all compounds, in particular organic compounds, with which solutions of substances can be prepared which are used in a reaction or processing of these substances.

Examples of preferred organic solvents are aliphatic or aromatic hydrocarbons which may or may not be halogenated, such as brominated or chlorinated hydrocarbons, and polar aprotic solvents such as amide solvents.

Preferred examples of organic, polar and aprotic solvents are N-methylpyrrolidone, N,N-dimethylformamide, N,N-dimethylacetamide and dimethyl sulfoxide.

The term "diluents for specific dilution of the solvent" is taken to mean liquids which differ from the respective solvent used and are specifically added to the solvent in the broadest sense before or during the reaction or processing process, in order to achieve a desired change of the dissolved substance, for example a change in the solubility of the dissolved substance, or to carry out an adjustment of a required process parameter, such as the viscosity of the solution, but also to reduce the costs for the respective solvent used.

These can therefore be mixtures of different solvents for the substance intended to be reacted or processed or else mixtures of solvents and non-solvents for the said substance, in particular these are a combination of solvents and non-solvents, the combination itself no longer acting as a solvent but as a precipitant for the said substance.

The diluent is particularly preferably a non-solvent, in particular water, for the substance intended for reaction or processing.

Preferred combinations of solvent and diluent in the process according to the invention are mixtures of organic polar and aprotic solvent with water.

The definition "processing plant" is taken to mean a plant in the broadest sense in which the above-defined "chemical reaction of substances" or "processing of substances" is carried out. This can therefore be a plant for polymerization or a purification plant or, in particular, a plant for producing films or fibers.

The term "treatment apparatus" is taken to mean that part of the abovementioned "processing plant", in which the actual chemical reaction or processing is undertaken. Whereas the term "processing plant" denotes the entire plant, that is the "treatment installation" including all supply units, disposal units and control units.

The process according to the invention is used particularly in the cleaning of objects in which impurities are removed by treatment with a solvent.

The process according to the invention is very particularly preferably used in the shaping of substances in which polymers are converted from solutions into a desired form, in particular into films, fibers or coatings.

This includes very particularly preferably a shaping in which polymers are converted from solutions into fibre form, a wet-spin process or a dry-wet spin process being used, and a secondary treatment following in particular directly the precipitation of the filament in the coagulation bath.

The used mixture as described in step e1) is preferably a mixture which originates from the coagulation bath of a wet-spin plant and which contains an organic, polar and aprotic solvent or mixtures of such solvents and water.

For the solvent recovery, all processes known for this purpose can be used by means of which a separation of the mixture into a solvent fraction and a diluent fraction is possible.

Examples of such processes are the extractive, absorptive, adsorptive and, in particular, the separation by distillation of the used mixture as described in step e1).

The separation is preferably carried out in a rectification column.

The mixture of spinning solvent, water and residues from the precipitation bath and the secondary treatment, originating from the coagulation bath and, possibly, the secondary treatment apparatuses, such as drawing baths, finishing baths and washing baths, is particularly preferably passed to a solvent recovery plant and the mixture is separated there by rectification into a solvent fraction, into a diluent fraction and into residues from the precipitation bath and the secondary treatment.

In a particularly preferred embodiment of the process according to the invention, the composition of the solvent fraction and diluent fraction leaving the rectification column is chosen so that the coolant for the rectification column does not have to be subjected to an additional cooling before its use or the preheated coolant can be used for the operation of at least a part of the rectification column. This embodiment is based on the finding that in some cases it can be entirely sufficient not to carry out a complete separation in the solvent fraction or diluent fraction and to take off part of this fraction from the column via a side take-off beneath the column head. This fraction has a higher boiling point than the solvent fraction or diluent fraction taken off over the head and can therefore be condensed at a higher temperature than the purer overhead fraction. With this embodiment of the process according to the invention, an additional energy saving or improved energy utilization can be achieved.

A further particularly preferred variant of the process according to the invention relates to the return of at least some of the solvent fraction or diluent fraction via an exhaust air scrubber which is intended to purify the exhaust air which originates from the processing plant and is enriched with solvent vapors and diluent vapors. With this embodiment, too, an additional coolant water saving and thus also an energy saving can be achieved. For this purpose, e.g. the cooled diluent fraction is conducted through the scrubber in counter-current to the laden exhaust air, so that the solvent residues and diluent residues condense and are returned into the treatment plant with the diluent fraction.

The invention also relates to the combination shown of apparatuses for carrying out the process described.

In the following FIGS. 1 to 8, the present invention is described by way of example.

DETAILED DESCRIPTION

Figure 1:
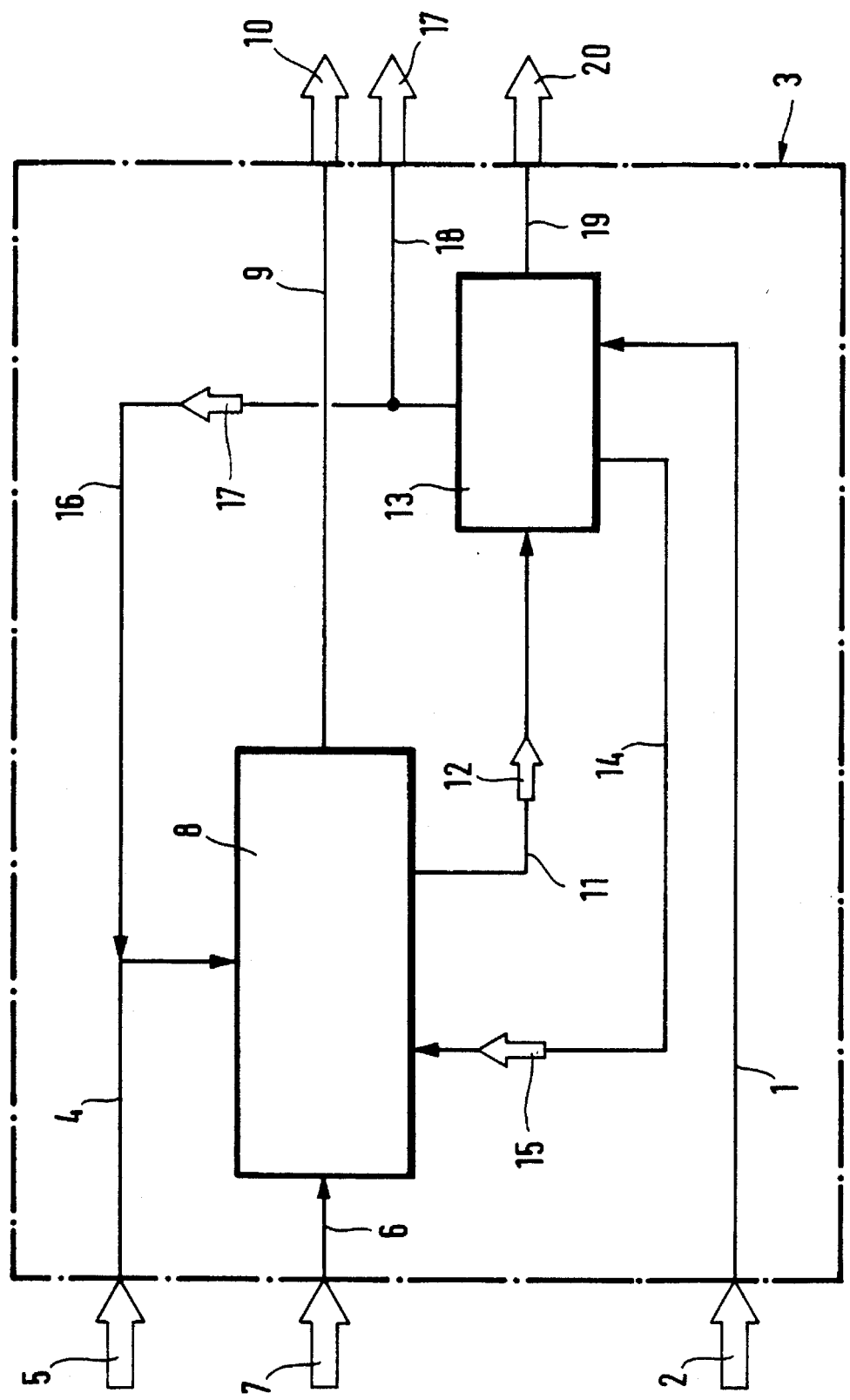
FIG. 1 shows a diagram of the principle of the process according to the invention.

In FIG. 1, the process according to the invention is shown diagrammatically. Production processes or processing processes which require a specific dilution of the solvent used can be operated more favorably by returning to the process at least some of the substance used for the dilution. In FIG. 1 a processing plant (3) is shown in which a chemical reaction and/or processing of substances (7) is carried out. Fresh solvent (2) is introduced into the processing plant (3) via a feed line (1); this fresh solvent generally serves for covering losses which result during operation of the plant. A further feed line (4) serves for introducing fresh diluent (5) into the processing plant (3)$ furthermore, at least one feed line (6) is present which serves for introducing, into a treatment apparatus (8) of the processing plant (3), substances (7) to be reacted and/or to be processed. The products (10) formed in the processing plant (3), such as reaction products or processed substances, are ejected via the discharge line (9) from the processing plant (3).

A further line (11) serves for feeding the used mixture (12) of solvent, diluent and residues from the treatment apparatus (8) into a solvent recovery plant (13); this plant (13) has a return line (14) for returning the reprocessed solvent fraction (15) to the treatment apparatus (8), and has a further return line (16) for returning the reprocessed diluent fraction (17) to the treatment apparatus (8). The return line (16) can have an outlet line (18) by which some of the diluent is removed from the process. In addition, the solvent recovery plant (13) has an outlet line (19), via which waste substances (20) are removed from the process circulation.

Figure 2:
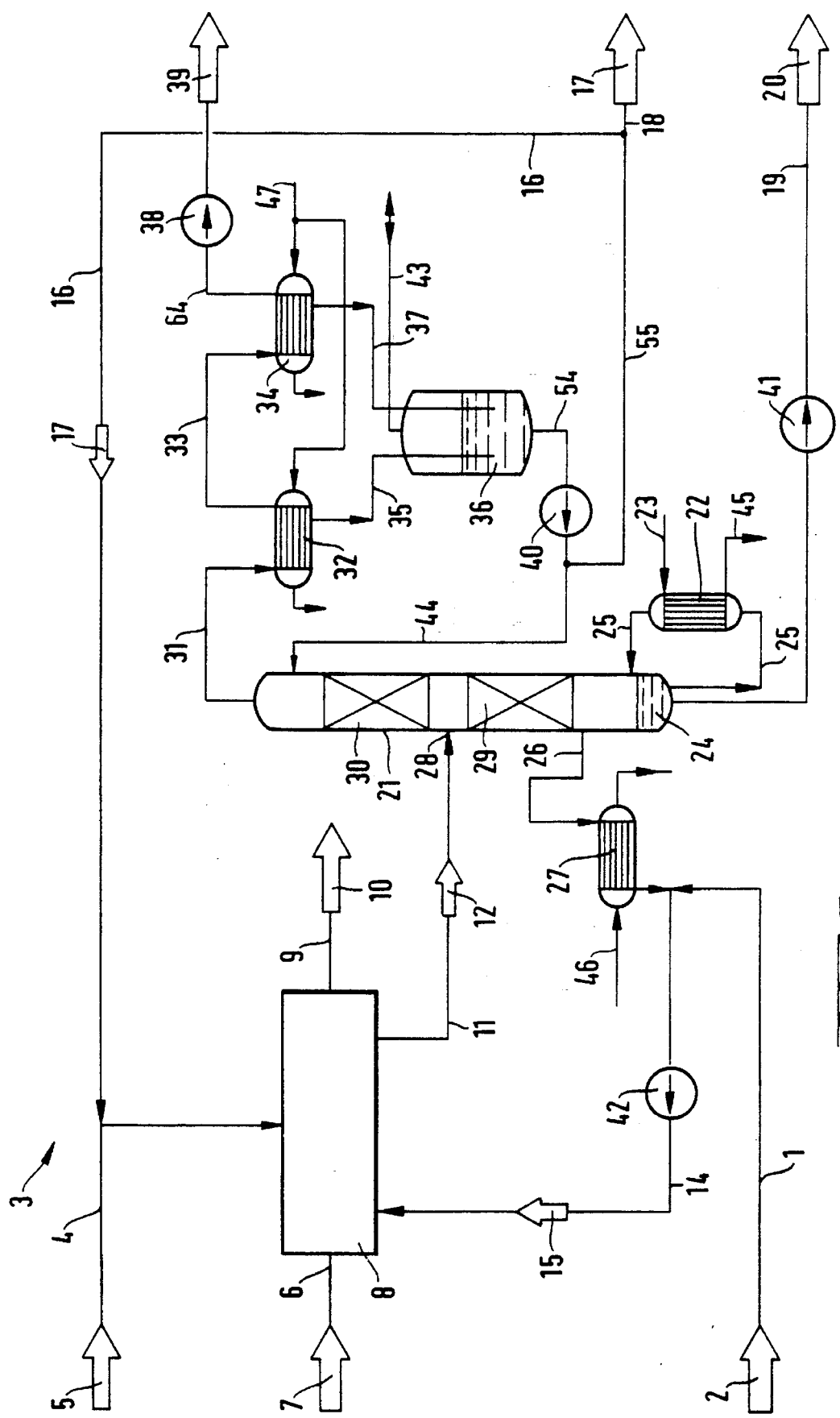
In FIGS. 2 and 3, an embodiment of the process according to the invention is shown, in which the solvent reprocessing is carried out by means of a rectification column. In the variants shown, a solvent is used which is higher-boiling or lower-boiling than the diluent used.

In FIG. 2, a circuit of solvent fraction and diluent fraction is shown which are recovered by rectification of the contaminated solvent resulting in the production process or processing process. In the plant shown, a separation into a higher-boiling solvent fraction and a lower-boiling diluent fraction is performed. Fresh solvent (2) is introduced via a feed line (1) into a treatment apparatus (8) of the processing plant (3); this generally serves to cover losses which result in operation of the plant. A further feed line (4) serves for introducing fresh diluent (5) into the treatment apparatus (8) furthermore, at least one feed line (6) is present which serves for introducing into the treatment apparatus (8) substances (7) to be reacted and/or to be processed. The products (10) formed in the treatment apparatus (8) are ejected via the discharge line (9).

A further line (11) serves for feeding the used mixture (12) of solvent, diluent and residues from the treatment apparatus (8) into a rectification column (21). The feed (28) is mounted at the height of the column body at which the concentration of solvent and diluent in the used mixture roughly corresponds with the concentration of the respective fractions within the rectification column. In the column, a separation is carried out of the used mixture (12) into a higher-boiling solvent fraction, which is taken off from the column via a side take-off (26), and into a lower-boiling diluent fraction, which is taken off via the head through the line (31). In the column are situated trays and/or packed beds (29) and (30) conventional per se. The waste substances (20) accumulate in the bottom (24) and are removed via the discharge line (19). The heating of the column is carried out in the form shown via a heat exchanger (22) through which a bottom liquid flows, which is removed from the column (21) and returned to it via the line (25). Feed line (23) and outlet line (45) serve for supplying the heat exchanger (22) with heating medium, for example with superheated steam. The solvent fraction (15) removed via the side take-off (26) is returned via a heat exchanger (27), which is operated as a cooler, to the treatment apparatus (8) via a return line (14).

The diluent fraction removed from the head of the column (21) via the line (31) is condensed in the condensers (32) and (34), connected in series by a line (33), and fed via the lines (35) and (37) to a storage tank (36), which is ventilated or vented via the line (43). Condenser (34) is equipped with a discharge line (64) via which exhaust gas (39) can be removed from the system. The storage tank (36) is emptied via a line (54), which divides into a return line (44) and a discharge line (55). Some of the condensate formed is conventionally returned via the return line (44) to the column (21). The discharge line (55) branches into an outlet line (18) and into a return line (16) for returning the reprocessed diluent fraction (17) to the treatment apparatus (8).

The control of the mass flow rates in the individual lines is carried out by pumps (38), (40), (41) and (42).

Figure 3:
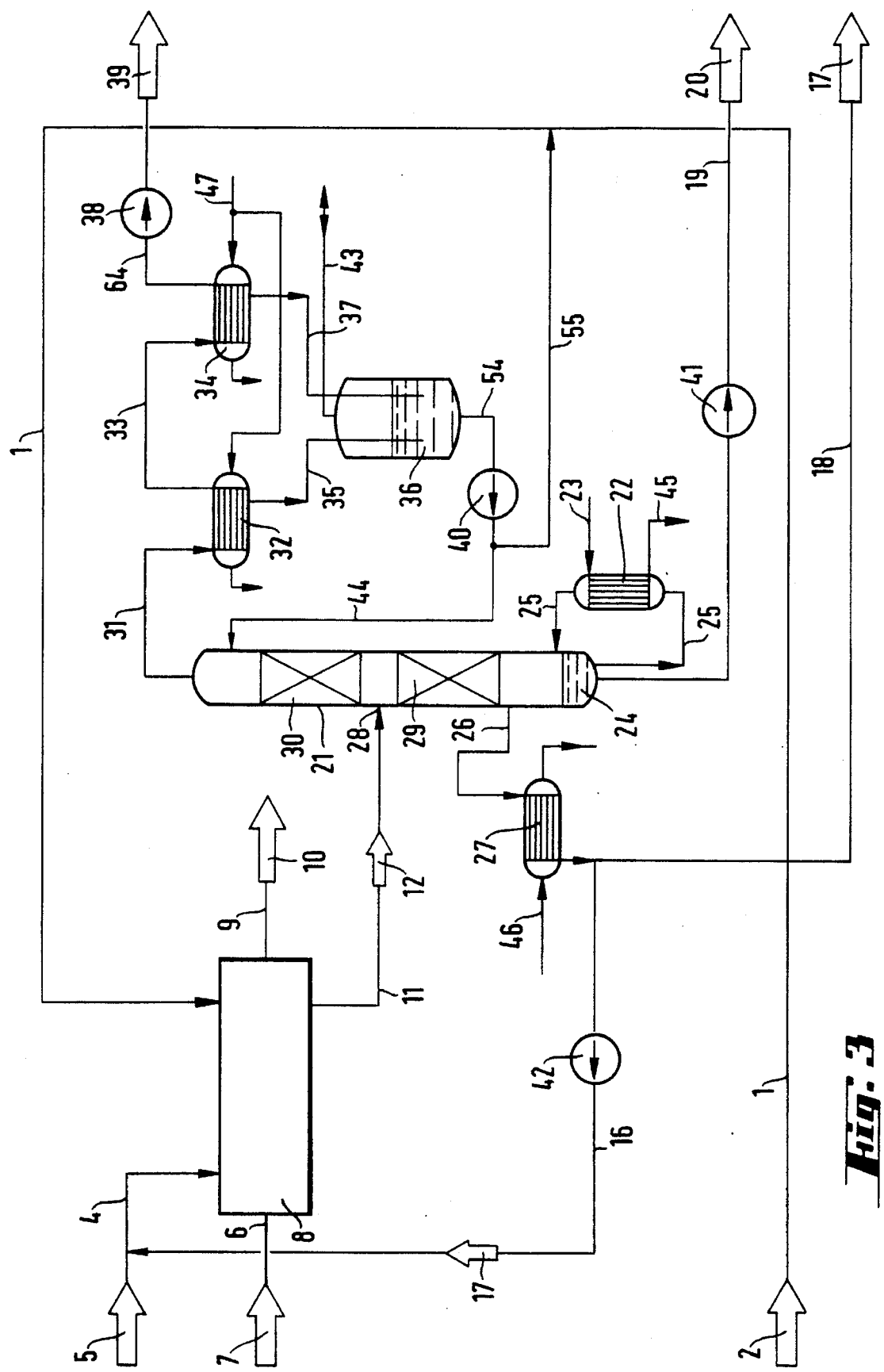

In FIG. 3, a circuit of solvent fraction and diluent fraction is shown which are recovered by rectification of the contaminated solvent produced in the production or processing process. The plant shown resembles that of FIG. 2, but here a separation into a higher-boiling diluent fraction and a lower-boiling solvent fraction is performed. The individual components and their connection correspond substantially to the design as in FIG. 2; see above for the description thereof. In the storage tank (36), in a modification to FIG. 2, there accumulates the solvent fraction which is passed via the discharge line (55) into the feed line (1) for fresh solvent (2).

Figure 4:
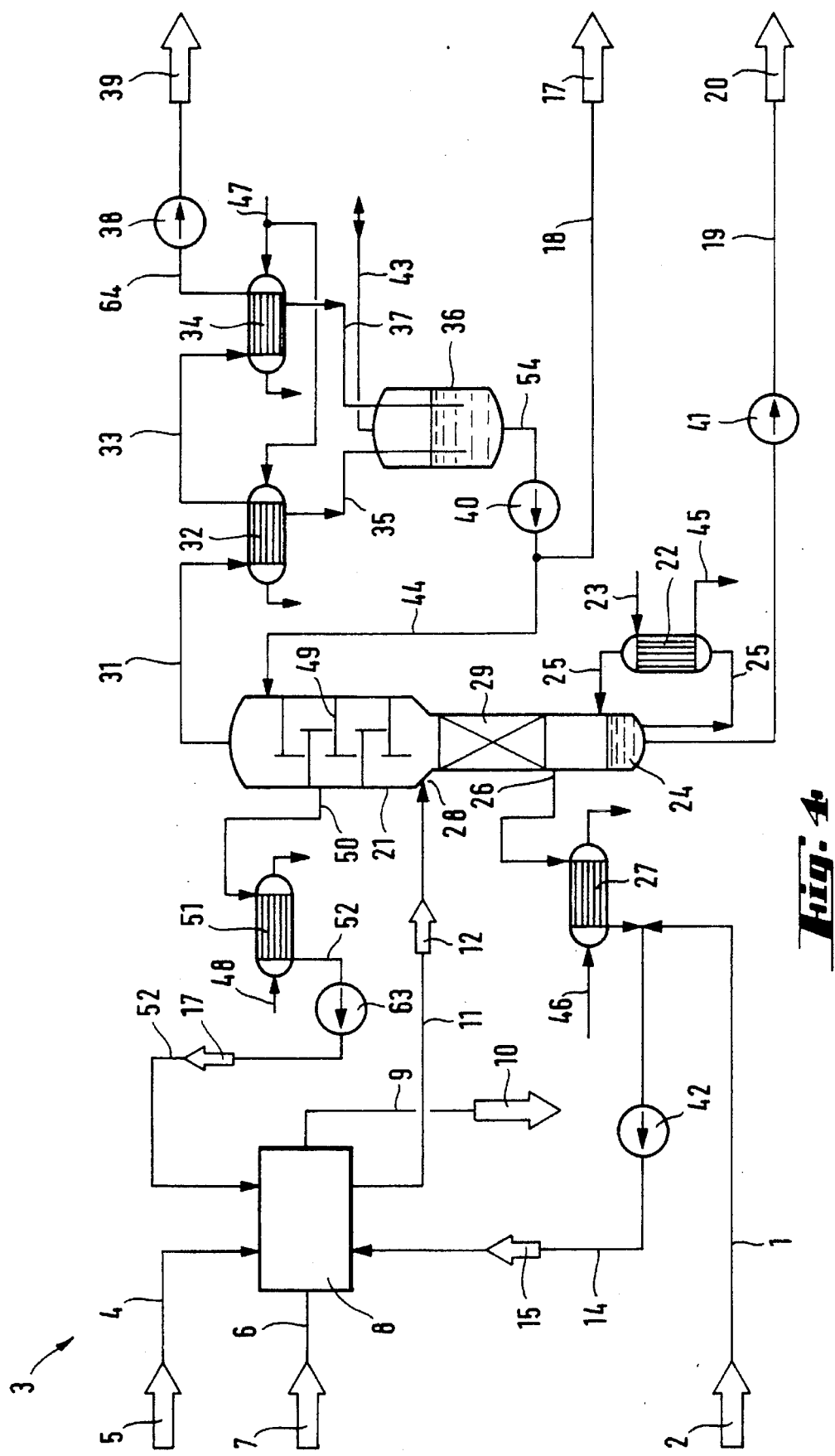
In FIGS. 4 and 5, embodiments of the process according to the invention are shown in which the production or processing process permits a certain preloading of solvent in the diluent. In the variants shown, the preloaded diluent is withdrawn from the rectifying column via a side take-off.

In FIG. 4 is shown a circuit for solvent fraction and diluent fraction which are recovered by rectification of the contaminated solvent produced in the production process or processing process. In the plant shown, a separation into a higher-boiling solvent fraction and into a lower-boiling diluent fraction is performed. The embodiment shown in FIG. 4 differs from the embodiment shown in FIG. 2 essentially by the diluent fraction returned to the treatment apparatus (8) being removed from the rectification column via a side take-off (50) situated beneath the column head. The composition of this diluent fraction differs from the composition of the diluent fraction taken off over the head; the boiling point of the former fraction is also higher, so that the condensation of this fraction can be performed at a higher temperature than the condensation of the overhead fraction.

Fresh solvent (2) is introduced via a feed line (1) into a line (14) which opens out into the treatment apparatus (8) of the processing plant (3). A further feed line (4) serves for introducing fresh diluent (5) into the treatment apparatus (8); in addition, at least one feed line (6) is present which serves for introducing into the treatment apparatus (8) substances to be reacted and/or to be processed. The products (10) formed in the treatment apparatus (8) are ejected via the discharge line (9).

A further line (11) serves for feeding the used mixture (12) of solvent, diluent and, possibly, residues, from the treatment apparatus (8) into a rectification column (21). The feed (28) is mounted at the height of the column body at which the concentration of solvent and diluent in the used mixture roughly corresponds with the concentration of the respective fractions within the rectification column. In the column is performed a separation of the used mixture (12) into a higher-boiling solvent fraction, which is taken off from the column via a side take-off (26), and into a lower-boiling diluent fraction, which is taken off via a side take-off (50) and over the head via the line (31). In the column are situated trays and/or packed beds (29) conventional per se as well as trays (49). The waste substances (20) accumulate in the bottom (24) and are removed via the discharge line (19). The heating of the column is carried out in the form shown via a heat exchanger (22) through which flows the bottom liquid which is removed from the column (21) and returned to it via the line (25). Feed line (23) and outlet line (45) serve for supplying the heat exchanger (22) with heating medium, for example with superheated steam. The solvent fraction (15) removed via the side take-off (26) is returned via a heat exchanger (27), which is operated as a cooler, to the treatment apparatus (8) via a return line (14).

The diluent fraction removed from the column (21) via the side take-off (50) is condensed in the condenser (51) and returned to the treatment apparatus (8) via the line (52). The cooling of condenser (51) is carried out by coolant (48) which can have a higher temperature than the coolant used in other condensers of the plant, for example coolants (46) and (47). This condenser can therefore be operated with coolant which has already passed through other condensers in the plant.

The diluent fraction removed from the head of the column (21) via the line (31) is condensed in the condensers (32) and (34) connected in series via line (33) and fed to a storage tank (36) via the lines (35) and (37). Condenser (34) is equipped with a discharge line (64) via which exhaust gas (39) can be removed from the system. The storage tank (36) is emptied via a line (54) which divides into a return line (44) and an outlet line (18). Some of the condensate formed is conventionally returned to the column (21) via the return line (44). Diluent (17) is ejected from the processing plant (3) via the outlet line (18).

The control of the mass flow rates in the individual lines is carried out by pumps (38), (40), (41), (42) and (63).

Figure 5:
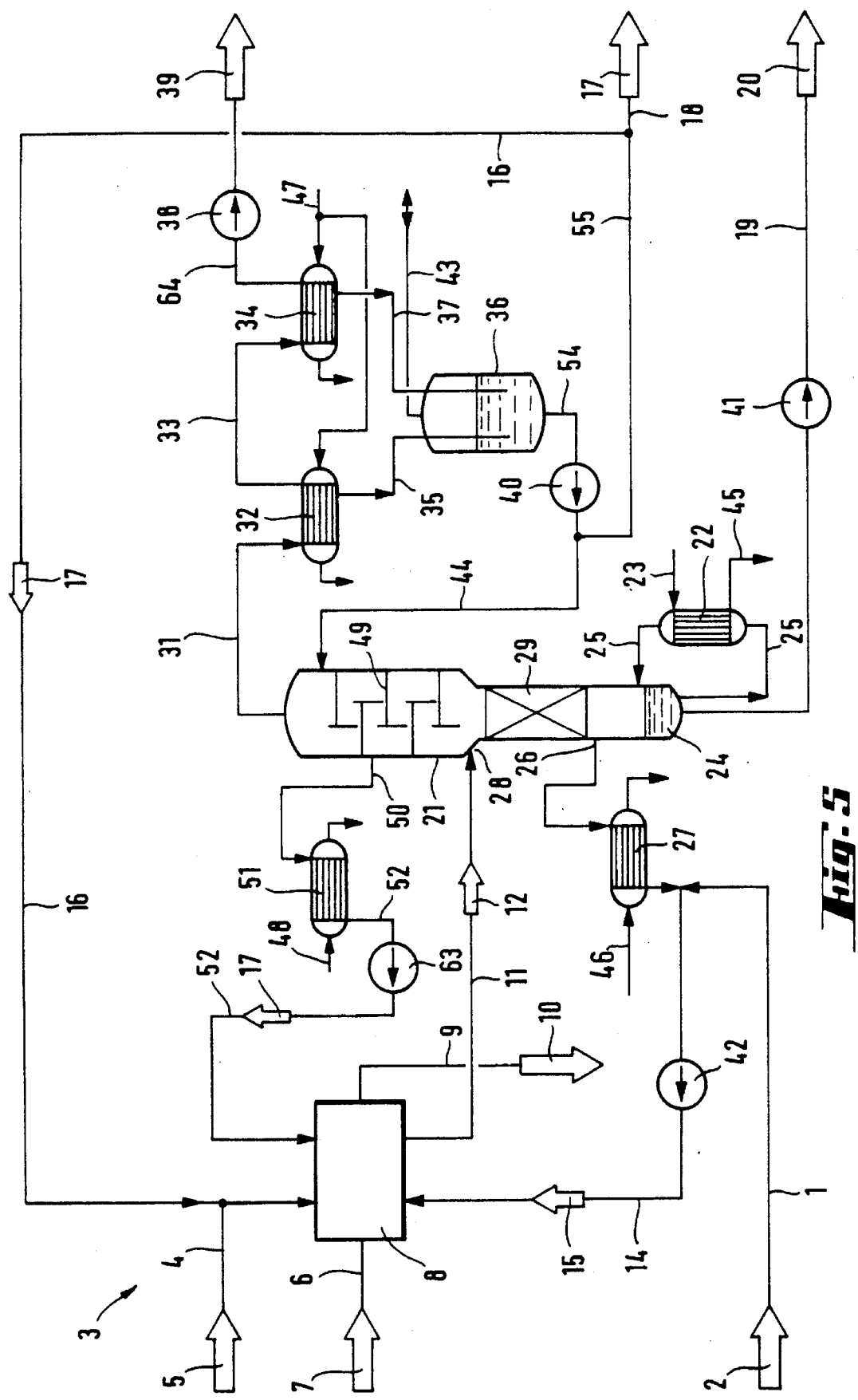

In FIG. 5 is shown a circuit of solvent fraction and diluent fraction which are recovered by rectification of the contaminated solvent produced in the production process or processing process. In the plant shown, a separation is carried out into a higher-boiling solvent fraction and into a lower-boiling diluent fraction. The embodiment shown in FIG. 5 differs from the embodiment shown in FIG. 4 essentially by the diluent fraction returned to the treatment apparatus (8) being removed from the rectification column both via a side take-off (50) situated under the column head and via the head. The individual components and their connection substantially correspond to the design as in FIG. 4 see above for their description. Discharge line (55) branches, in a modification to FIG. 4, into return line (16) and into outlet line (18).

Figure 6:
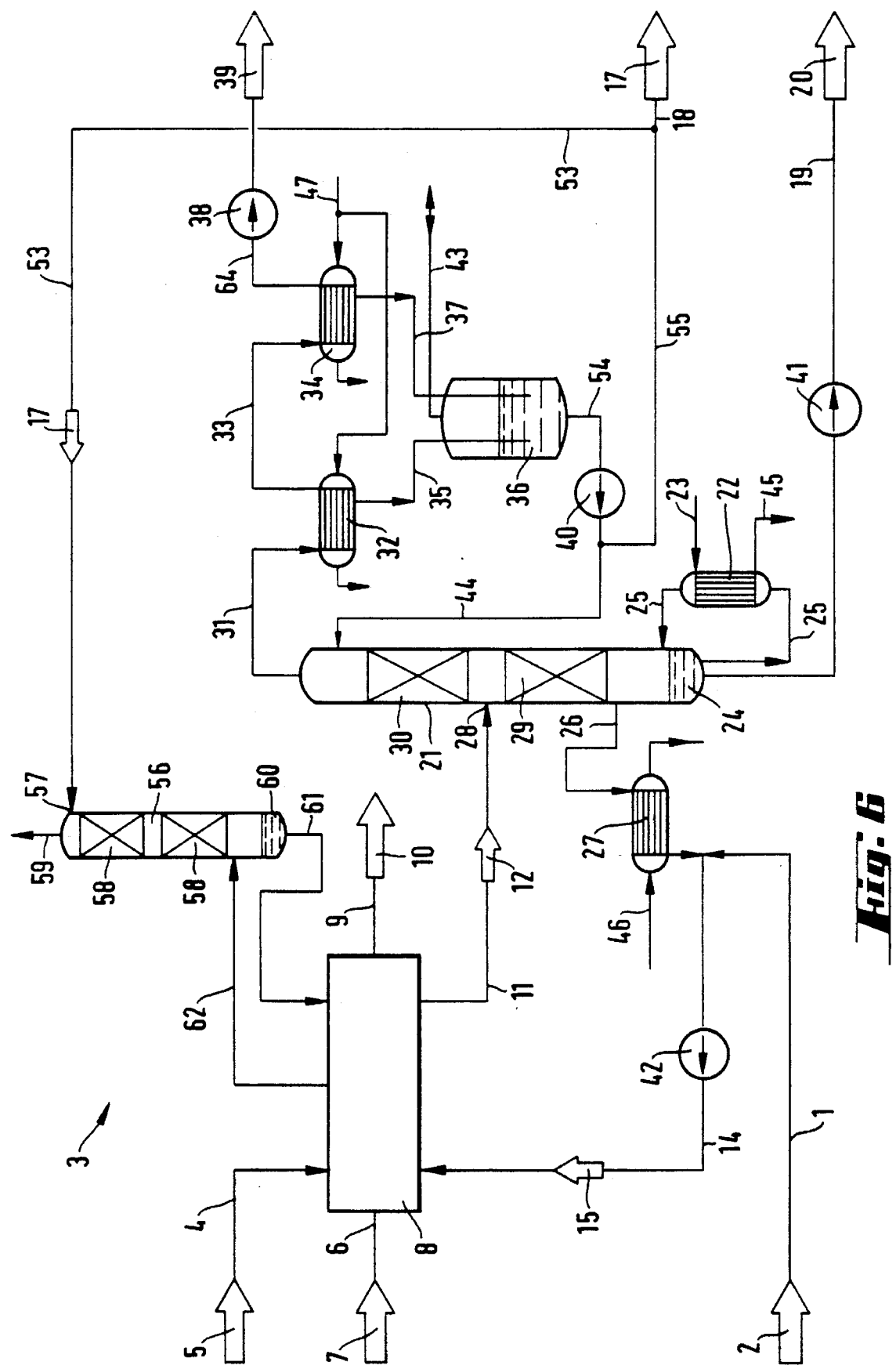
FIGS. 6, 7 and 8 show processes according to the invention in which an exhaust air scrubber is additionally used.

In FIG. 6 is shown a circuit of solvent fraction and diluent fraction which are recovered by rectification of the contaminated solvent produced in the production process or processing process. In the plant shown, a separation is carried out into a higher-boiling solvent fraction and into a lower-boiling diluent fraction. The return of the diluent fraction is carried out in this plant via an exhaust air scrubber (56).

The plant shown resembles that of FIG. 2, but here an exhaust air scrubber (56) is connected in series in the return of the diluent fraction. The individual components and their connection substantially correspond to the design as in FIG. 2 see above for their description.

The discharge line (55) branches into an outlet line (18) and into a return line (53) for returning the reprocessed diluent fraction (17) via an exhaust air scrubber (56) to the treatment apparatus (8). The exhaust air scrubber (56) conventionally contains trays or packed beds (58). In the form shown, the diluent fraction (17) is passed in via a feed (57), which is situated at the head of the exhaust air scrubber (56), and the exhaust air to be purified, which conventionally still contains solvent residues and diluent residues, is passed into the exhaust air scrubber (56) from the treatment apparatus (8) via the line (62) and conducted in counter-current to the diluent fraction (17). In the lower part of the exhaust air scrubber (56) forms a bottom liquid phase (60), which is returned to the treatment apparatus (8) via the line (61), while the purified exhaust air (59) leaves the exhaust air scrubber (56) via the head.

Figure 7:
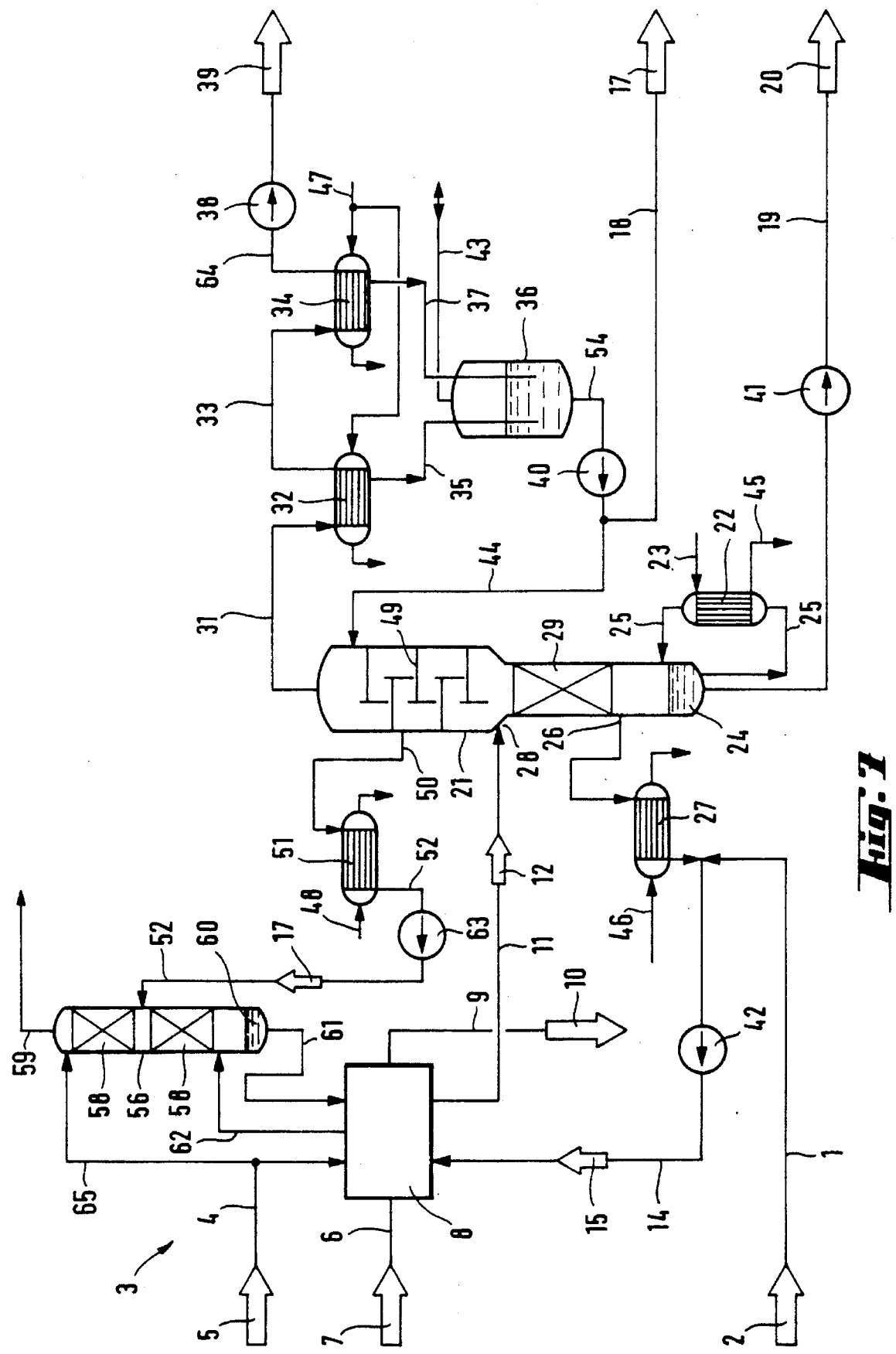

In FIG. 7 is shown a circuit for solvent fraction and diluent fraction which are recovered by rectification of the contaminated solvent produced in the production process or processing process. In the plant shown, a separation is performed into a higher-boiling solvent fraction and into lower-boiling diluent fractions. The embodiment shown in FIG. 7 resembles the embodiment shown in FIG. 4, in which the diluent fraction returned to the treatment apparatus (8) is removed from the rectification column (21) via a side take-off (50) situated beneath the column head. The plant shown resembles that from FIG. 4, but here an exhaust air scrubber (56) is connected in series in the return of the diluent fraction. The individual components and their connections substantially correspond to the design as in FIG. 4 see above for the description thereof.

This embodiment also has the advantage that the composition of the diluent fraction removed from the side take-off differs from the composition of the diluent fraction taken off via the head the boiling point of the former fraction is higher, so that the condensation of this fraction can proceed at a higher temperature than the condensation of the overhead fraction.

The line (52) for returning the reprocessed diluent fraction (17) opens out into an exhaust air scrubber (56). The exhaust air scrubber (56) conventionally contains trays or packed beds (58). In the form shown, the diluent fraction (17) is passed into the column body of the exhaust air scrubber (56) laterally and fresh diluent (5) is passed via the head into the exhaust air scrubber (56) via a further line (65). The exhaust air to be purified, which conventionally still contains solvent residues and diluent residues, is passed into the exhaust air scrubber (56) from the treatment apparatus (8) via the line (62) and is conducted in counter-current to the diluent fraction (17). In the lower part of the exhaust air scrubber (56) forms a bottom liquid phase (60) which is returned to the treatment apparatus (8) via the line (61). The purified exhaust air (59) is brought out of the head of the exhaust air scrubber (56).

Figure 8:
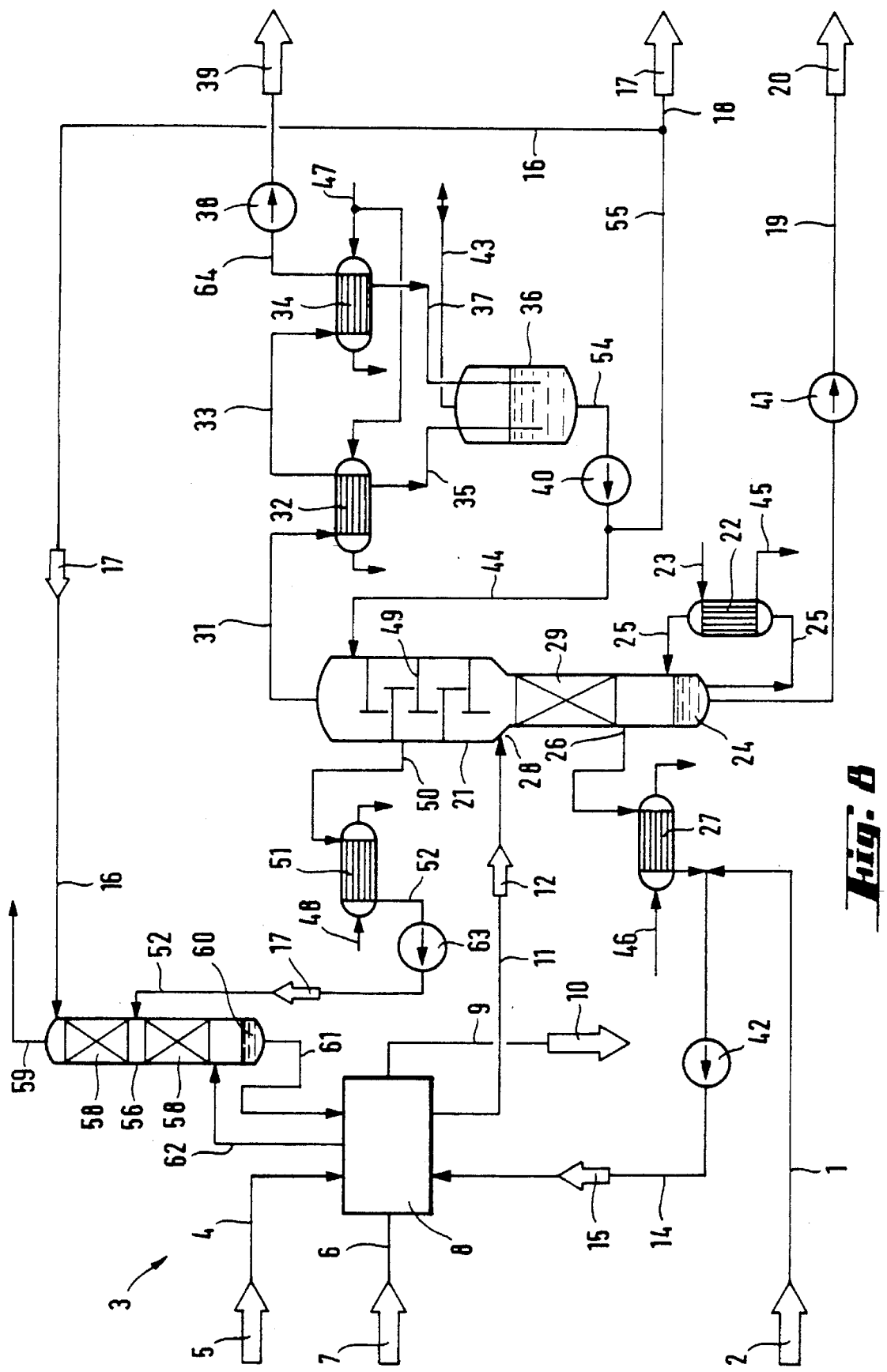

In FIG. 8 is shown a circuit for solvent fraction and diluent fraction which are recovered by rectification of the contaminated solvent produced in the production process or processing process. In the plant shown, a separation is carried out into a higher-boiling solvent fraction and into lower-boiling diluent fractions. The embodiment shown in FIG. 8 resembles that in FIG. 5, in which the diluent fractions returned into the treatment apparatus (8) are removed from the rectification column both via a side take-off (50) situated under the column head and via the head. In addition to the embodiment according to FIG. 5, an exhaust air scrubber (56) is connected in series in the return of the two diluent fractions. The individual components and their connection substantially correspond to the design as in FIG. 5; see above for the description thereof.

The lines (16) and (52) for returning the diluent fraction (17) open out into an exhaust air scrubber (56). The exhaust air scrubber (56) conventionally contains trays or packed beds (58). In the form shown, the diluent fraction (17) taken off from the column head is passed into the exhaust air scrubber (56) via the head and the diluent fraction (17) taken off from the column (21) out of the side take-off is passed into the center of the exhaust air scrubber (56) via the line (52). The exhaust air to be purified, which conventionally still contains solvent residues and diluent residues, is passed into the exhaust air scrubber (56) from the treatment apparatus (8) via the line (62) and is conducted in counter-current to the diluent fraction (17). In the lower part of the exhaust air scrubber (56) forms a bottom liquid phase (60) which is returned to the treatment apparatus (8) via the line (61).

We claim:

1. A method of recycling liquids used in a substance treatment process to form a treated substance comprising the steps of:

a) supplying at least one solvent to the substance treatment process, b) supplying at least one diluent to the substance treatment process, c) supplying at least one raw substance to the substance treatment process, d) contacting the raw substance with said at least one solvent and said at least one diluent to form a mixture comprising a treated substance, an used solvent, an used diluent, and residues, e) ejecting the treated substance from the substance treatment process, f) separating the used solvent, used diluent and residues by liquid recovery into an used solvent fraction which contains a major portion of used solvent, an used diluent fraction which contains a major portion of used diluent, and a treated residue fraction which contains a major portion of treated residue, g) returning the used solvent fraction to the substance treatment process, h) returning the used diluent fraction to the substance treatment process, and i) removing the treated residue fraction from the substance treatment process.

2. A process as claimed in claim 1, wherein the treatment process is a process of cleaning a solid substance by removing impurities with a solvent.

3. A process as claimed in claim 1, wherein the treatment process is a polymer shaping process by conversion of polymers from solution into films, fibers, or coatings.

4. A process as claimed in claim 3, wherein the polymer shaping process is a wet spinning or dry-wet spinning process followed by a secondary treatment.

5. A process as claimed in claim 3, wherein the spinning process utilizes a coagulation bath, and the used products are from this coagulation bath, and contain organic polar aprotic solvent and water.

6. A process as claimed in claim 1, wherein the solvent is an organic, polar, aprotic solvent.

7. A process as claimed in claim 1, wherein the solvent is selected from the group consisting of N-methylpyrrolidone, N,N-dimethylformamide, N,N-dimethylacetamide, and dimethyl sulfoxide.

8. The process as claimed in claim 1, in which exhaust air is created during the process, wherein steps g or h further comprise the steps of:

scrubbing exhaust air from the vicinity of the substance treatment process, said exhaust air being enriched with solvent or diluent vapors, and returning said solvent or diluent to the substance treatment process.

9. The method as claimed in claim 1, wherein the separation of step f) comprises rectification.

10. The method as claimed in claim 9, wherein the rectification is carried out in a rectification column having a coolant, and wherein the coolant is initially introduced at or above room temperature.

11. A method of recycling liquids used in a chemical reaction process to form an end product comprising the steps of:

a) supplying at least one solvent to the chemical reaction process, b) supplying at least one diluent to the chemical reaction process, c) supplying at least one substance to the chemical reaction process, d) contacting the substance with said at least one solvent and said at least one diluent to form the end product, a used solvent, a used diluent, and residue, e) ejecting the end product from the chemical reaction process, f) separating the used solvent, used diluent, and residue by liquid recovery into a used solvent fraction which contains a major portion of used solvent, a used diluent fraction which contains a major portion of used diluent, and a reaction residue fraction which contains a major portion of reaction residue, g) returning the used solvent fraction to the chemical reaction process, h) returning the used diluent fraction to the chemical reaction process, and i) removing the reaction residue fraction from the chemical reaction process.

12. The process as claimed in claim 11, wherein the chemical reaction process is polymerization, polyaddition, or polycondensation.

13. A process as claimed in claim 11, wherein the solvent is an organic, polar, aprotic solvent.

14. A process as claimed in claim 11, wherein the solvent is selected from the group consisting of N-methylpyrrolidone, N,N-dimethylformamide, N,N-dimethylacetamide, and dimethyl sulfoxide.

15. The process as claimed in claim 11, wherein the diluent is water.

16. The method as claimed in claim 11, in which exhaust air is created during the chemical reaction process, wherein steps g or h further comprise the step of:

scrubbing exhaust air from the vicinity of the chemical reaction process, said exhaust air being enriched with solvent or diluent vapors, and returning said solvent or diluent to the chemical reaction process.

17. The method as claimed in claim 11, wherein the separation of step f) comprises rectification.

18. The method as claimed in claim 17, wherein the rectification is carried out in a rectification column having a coolant, and wherein the coolant is initially introduced at or above room temperature.

19. A process for the recovery and reuse of liquids which are used as solvents, and liquids which are use for the dilution of solvents in a chemical reaction, processing of substances, or both, in a processing plant containing treatment apparatus, comprising the steps of:

introducing fresh solvent into the processing plant, introducing fresh diluent into the processing plant, introducing substances to be reacted, processed, or both, into the treatment apparatus with solvent and diluent, ejecting products from the processing plant, including a mixture of used solvent, used diluent, and used residues, separating the mixture of used solvent, used diluent, and used residues in a solvent recovery plant into a solvent fraction containing a major portion of used solvent, a diluent fraction containing a major portion of used diluent, and a residue fraction containing a major portion of used residue, returning the solvent fraction to the processing plant, returning the diluent fraction to the processing plant, and ejecting the residue fraction from the processing plant.

20. The process as claimed in claim 1, wherein the diluent is water.

* * * * *